(12) United States Patent
West et al.

(10) Patent No.: US 7,956,574 B1
(45) Date of Patent: *Jun. 7, 2011

(54) SYSTEM AND METHOD FOR INTERCONNECTION OF BATTERY PACKS

(75) Inventors: Dorian West, Menlo Park, CA (US); Eugene Berdichevsky, Palo Alto, CA (US); Scott Kohn, Menlo Park, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/658,707

(22) Filed: Feb. 12, 2010

Related U.S. Application Data

(63) Continuation of application No. 11/414,050, filed on Apr. 27, 2006, now Pat. No. 7,667,432.

(51) Int. Cl.
*H02J 7/00* (2006.01)
(52) U.S. Cl. ......... 320/112; 320/107; 320/116; 320/126
(58) Field of Classification Search .................. 320/103, 320/107, 112
See application file for complete search history.

(56) References Cited

U.S. PATENT DOCUMENTS

| | | | |
|---|---|---|---|
| 3,165,689 A | 1/1965 | Hughes | |
| 4,065,710 A | 12/1977 | Zytka | |
| 4,177,376 A | 12/1979 | Horsma et al. | |
| 5,185,898 A | 2/1993 | Johnson | |
| 5,191,275 A | 3/1993 | Singhai | |
| 5,747,964 A | 5/1998 | Turnbull | |
| 5,816,847 A | 10/1998 | Snyder | |
| 5,977,746 A | 11/1999 | Hershberger et al. | |
| 5,982,050 A | 11/1999 | Matsui | |
| 6,127,798 A | 10/2000 | Lansang et al. | |
| 6,137,260 A | 10/2000 | Wung et al. | |
| 6,391,489 B1 | 5/2002 | Winch et al. | |
| 6,541,151 B2 | 4/2003 | Minamiura et al. | |
| 6,636,016 B2 | 10/2003 | Tanaka et al. | |
| 7,183,746 B1 | 2/2007 | Carter | |
| 7,208,247 B2 | 4/2007 | Chan et al. | |
| 2002/0022159 A1 | 2/2002 | Pierson et al. | |
| 2003/0227275 A1 | 12/2003 | Kishi et al. | |
| 2004/0049243 A1 | 3/2004 | Seligman | |
| 2004/0160209 A1 | 8/2004 | Emori et al. | |
| 2004/0169489 A1 | 9/2004 | Hobbs | |
| 2004/0191542 A1 | 9/2004 | McLeod et al. | |
| 2004/0241540 A1 | 12/2004 | Tsutsumi et al. | |
| 2004/0258982 A1 | 12/2004 | Coffey et al. | |
| 2005/0151509 A1 | 7/2005 | Cook | |
| 2005/0170245 A1 | 8/2005 | Vartak et al. | |
| 2006/0071630 A1 | 4/2006 | Dame et al. | |
| 2006/0091855 A1* | 5/2006 | Seo | 320/116 |
| 2006/0246350 A1* | 11/2006 | Takayama et al. | 429/178 |
| 2007/0126400 A1* | 6/2007 | Benckenstein et al. | 320/119 |
| 2007/0188147 A1 | 8/2007 | Straubel et al. | |
| 2007/0194755 A1 | 8/2007 | Makhija et al. | |

* cited by examiner

*Primary Examiner* — Arun Williams
(74) *Attorney, Agent, or Firm* — Patent Law Office of David G. Beck

(57) ABSTRACT

A system and method interconnects battery packs using a flexible bus bar to prevent vibration from breaking or damaging the connections therebetween.

11 Claims, 4 Drawing Sheets

SYSTEM AND METHOD FOR INTERCONNECTION OF BATTERY PACKS

RELATED APPLICATIONS

This application is a continuation of U.S. application Ser. No. 11/414,050 entitled "System and Method for Interconnection of Battery Packs" filed on Apr. 27, 2006 now U.S. Pat. No. 7,667,432 by Dorian West, Gene Berdichevsky and Scott Kohn and is related to the subject matter of application Ser. No. 11/129,118 entitled, "Method and Apparatus for Mounting, Cooling, Connecting and Protecting Batteries" filed on May 12, 2005 by Jeffrey B. Straubel, Eugene Berdichevsky, David Lyons, Thomas Colson, Martin Eberhard, Ian Wright and Robert Ferber, and application Ser. No. 11/353,648 entitled, "System and Method for Fusibly Linking Batteries" filed on Feb. 13, 2006 having the same inventors and assignee as this application and are hereby incorporated herein by reference in its entirety.

FIELD OF THE INVENTION

The present invention is related to battery systems and more specifically to interconnections among battery assemblies.

BACKGROUND OF THE INVENTION

As described in the related application, conventional rechargeable batteries may be arranged as small sets of batteries coupled to one or more conductors at either end of the sets of batteries, thereby coupling each set of batteries in parallel. The small sets of batteries may be coupled to one another in series to generate higher voltages than the voltages of the batteries themselves. The series-coupled sets of batteries may be provided in a single pack for ease of handling. However, it may be desirable to couple two or more of these packs to one another in series to generate higher voltages or in parallel to generate higher currents, or a combination of series and parallel couplings to achieve both a higher current and a higher voltage.

This inter-pack, series or parallel coupling can present various problems. For example, the related application described a geometry in which an odd number of smaller sets of parallel-connected batteries were arranged to allow connection via a u-shaped connector screwed into adjacent packs. However, this arrangement required the use of screws and bolts interior to the packs. The use of screws and bolts interior to the pack required extreme care to prevent dropping the screw or bolt into the pack, potentially shorting the batteries to one another. The screws could have been placed outside the packs to avoid the problems of dropping screws, however, access between the housings to get to the screws would have required space to be wasted.

Conventional wires or solid metal connectors may be used as conductors, as long as the wires or connectors have sufficient current carrying capacity. In a high-current environment, the wires or metal connectors must have sufficient thickness to carry the current required. However, with this thickness comes stiffness. In a high vibration environment, such as an electric or hybrid vehicle like a car or rocket, the wires or thick pieces of metal coupled to battery packs that are moving relative to one another as the vehicle flexes, could cause stresses on the metal conductors, the packs or the terminals connecting the packs to the wires or metal conductors. The stress could cause cracks in the conductors or the packs or cause a loosening at the terminals, and any or all of these things could lead to premature failure of the entire assembly, sparks, or changes to the electrical characteristics.

It can be desirable for any solution to have several properties. First, it can be desirable to keep connectors as short as possible. Short connectors keep the impedance of the connectors low, reducing losses and minimizing the electrical reaction of the connectors as changes occur in power supplied by the batteries. One potential solution towards keeping the conductors short is to use two sets of battery packs that "mirror" one another, allowing conductors to be placed back to back, for example, to reduce the length of the connectors that run between them. However, using different battery packs can increase the complexity of manufacturing and maintenance, as twice as many parts must be stocked and maintained as spares. Additionally, having mirror image battery packs may allow the wrong pack to be at least partially installed, requiring removal of the wrong pack and installation of the proper pack.

What is needed is a system and method that can allow for interconnections of battery packs, for example, with each pack containing multiple sets of parallel connected batteries, and each set connected in series, without placing screws or bolts interior to the packs, and without requiring space between each of the packs, and that can carry large amounts of currents in a high vibration environment, without damaging the packs or the interconnections, and without inducing stresses that would loosen the connections between the interconnecting conductors and the packs, cause sparks or change the electrical characteristics, without requiring lengthy interconnections, and without requiring mirror image battery packs.

SUMMARY OF INVENTION

A system and method folds the terminals of the battery packs from one face over another face of the packs. Two holes in the terminals are used to electrically connect a conventional flexible bus bar to one of the terminal conductors in each of up to two adjacent packs, thereby connecting the packs in series or parallel, without requiring screws or bolts interior to the pack that can fall into the packs, and without requiring space between the packs. The lack of the possibility that screws or bolts can fall into the packs means less care can be used, reducing manufacturing costs of interconnecting the packs. Because the flexible bus bar will carry large amounts of current but can physically flex, it will not induce stresses in a high vibration environment that can cause a failure of the assembly, sparking or changes to the electrical characteristics of the pack. The battery packs themselves can use an arrangement of the series-connected sets of batteries that allows the bus bars to be short, yet avoids the use of mirror-image or other types of different battery packs.

BRIEF DESCRIPTION OF THE DRAWINGS

FIG. 3 is a block-schematic diagram of a system of series-interconnected battery packs according to another embodiment of the present invention.

FIG. 5 is a block-schematic diagram of a system of series- and parallel-interconnected battery packs according to another embodiment of the present invention.

DETAILED DESCRIPTION OF A PREFERRED EMBODIMENT

Figure 1:
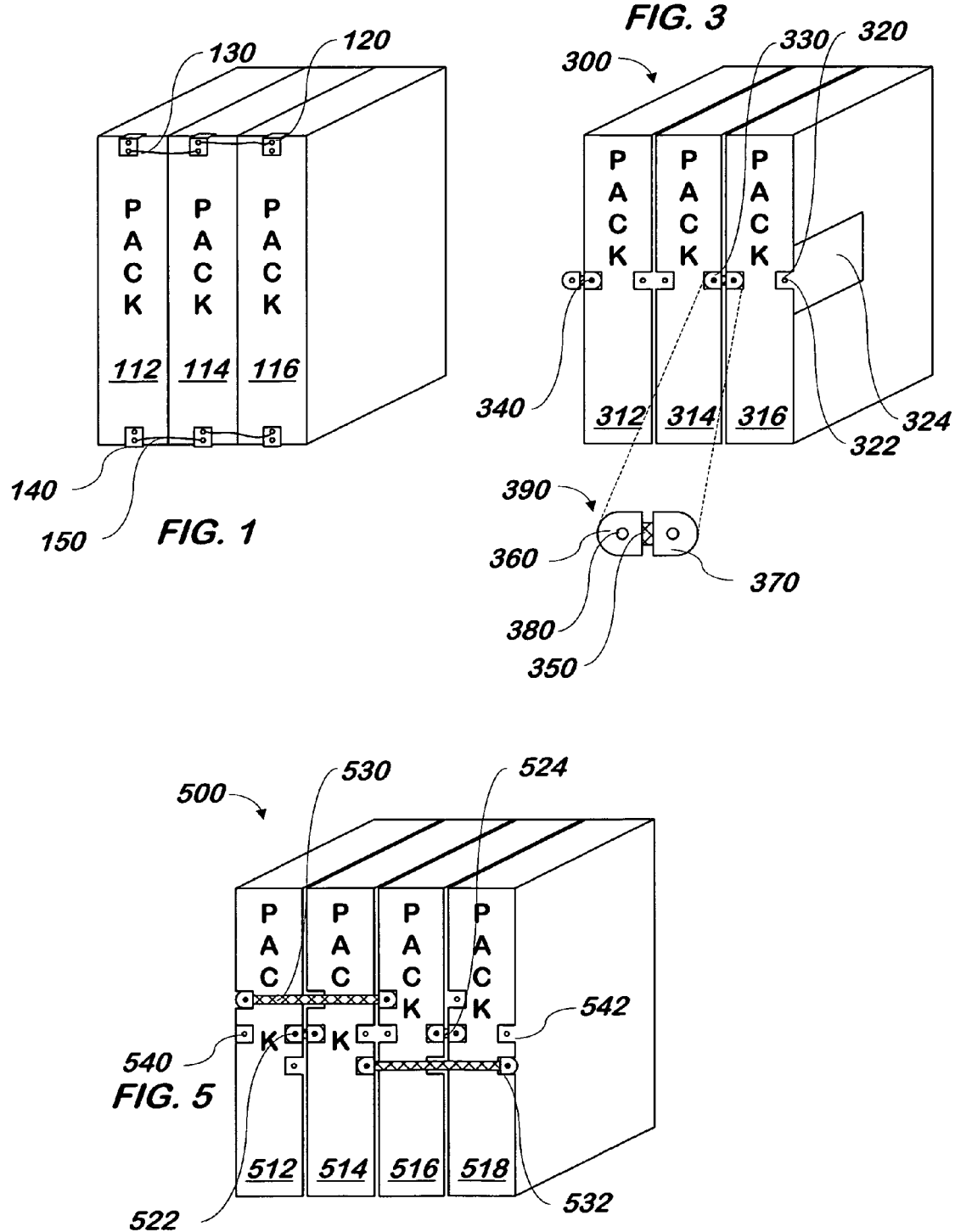
FIG. 1 is a block schematic diagram of a system of parallel-interconnected battery packs according to one embodiment of the present invention.

FIG. 1 is a block schematic diagram of a system of interconnected battery packs according to one embodiment of the present invention. FIG. 1 shows parallel interconnected battery packs, but battery packs may be connected in series as is shown in FIG. 3, and battery packs may be connected in series and parallel as is shown in FIG. 5.

Referring now to FIG. 1, battery pack 112 is electrically coupled via flexible bus bars 130, 150 to battery pack 114. Battery pack 114 is similarly coupled electrically to battery pack 116. In one embodiment, each pack 112, 114, 116 is adjacent or nearly adjacent to each of the other packs 112, 114, 116. In one embodiment, each battery pack 112, 114, 116 consists of a set of battery bricks connected in series as described below. Each battery brick is a set of batteries connected in parallel to one another, as described below. The battery bricks are not separately shown in the Figure, but are shown in the related application as sets of parallel-connected batteries.

Battery pack 112 is selected as a representative pack, but packs 114 and 116 are constructed in the same manner. Each terminal 130, 140 of battery pack 112 is a metal connector on the outside edge of battery pack 112. Each terminal 130, 140 is connected to one of the terminals of the brick at the edge of the set of bricks. Each terminal 130, 140 extends from a side of the pack 112, such as the top or bottom, and then folds over to a plane parallel to another side of the pack. The first side may be open so that the batteries are exposed to view, access or both, and the other side may be sealed so that the batteries are not exposed to view or access. The open side permits the terminal 130, 140 to extend from the pack 112 without interference and the second side prevents screws intended for the terminal 130, 140 from falling into the pack 112.

A flexible bus bar 150 connects external terminal 140 of battery pack 112 to an external terminal of battery pack 114. In one embodiment, flexible bus bar 150 is a conventional mesh-like, flexible ribbon or tube of multiple, thin wire strands which allows a very high current carrying capacity while reducing the danger of stresses and fractures to the assembly. In one embodiment, flexible bus bar 150 is a conventional flexible bus bar, such as may be fabricated using conventional ground braids, such as the conventional FTCB 15-35 ground braid with a crimped-on lug commercially available from Erico, of Solon, Ohio (at the website of Erico.com). The extreme flexibility of flexible bus bar 150 relative to ordinary electric facilities that can carry a similar current as that which can be carried by the flexible bus bar 150 is advantageous in a high vibration environment, such as the engine of a car, because the wiring will not break or fracture itself, or the components to which it is connected, as those components vibrate or move relative to one another. A non-flexible method of wiring, particularly a non-flexible method of wiring that is expected to carry a high level of current like a solid conductor, could fracture or break, or induce fractures or breaks in the packs 112, 114, 116.

Battery pack 114 and battery pack 116 are coupled to one another in a similar manner, and any number of additional battery packs may be coupled to one another in this manner. FIG. 1 illustrates battery packs coupled in parallel; however, as shown in more detail in FIG. 3, battery packs may also be coupled in series using the flexible bus bar arrangement described herein. Other arrangements could couple some battery packs in series and others in parallel, according to the voltage and current needs of the device or devices that use the current and voltage supplied by the battery packs 112, 114, 116.

Another Embodiment

Connecting Battery Packs in Series

Referring now to FIG. 3, a set 300 of interconnected battery packs 312, 314, 316 is shown according to another embodiment of the present invention, and a flexible bus bar 390 is shown in more detail. Battery packs 312, 314, 316 are similar to battery packs 112-116 shown in FIG. 1. As described in the related application Ser. No. 11/129,118, the series connections of each brick in a battery pack such as battery pack 316 is made via a solid conductor spanning two bricks. Each brick has a set of batteries oriented in the same polarity, but opposite to that of the electrically adjacent brick. Thus, the batteries in each brick are oriented upside down relative to the batteries in the adjacent bricks. A single solid conductor not only connects one of the polarity terminals one set of batteries in one brick to one another in parallel, but many of them extend to also connect the opposite polarity terminals of another set of batteries in an adjacent brick to one another in parallel. The effect of using this single conductor is to connect the two sets of batteries in series to one another. For example, a conductor can be in electrical contact with the positive terminals of the batteries in brick 1, as well as the negative terminals of the batteries in brick 2, connecting brick 2 in series with brick 1. There may be any number of series-connected bricks in a battery pack, though, as mentioned above, in one embodiment, the number of bricks is nine. Each brick in a given battery pack is therefore adjacent to any other brick to which it is directly connected in series in this manner.

The conductors at either end of the series of bricks contact just the conductors of one brick. So, using the example above, if brick 1 is the end of the series of bricks, the negative terminals of the batteries of brick 1 may be electrically connected via a conductor, which is coupled to the edge terminal of the battery pack. For example, conductor 324, shown in the Figure, may be the negative terminal for the battery pack. (The remaining conductors are not shown to avoid cluttering FIG. 3, but are shown in more detail in FIGS. 4A and 4B.) In one embodiment, the conductor 324 is electrically connected to, or forms, a terminal 320, which is used as the negative terminal for the battery pack 316. In one embodiment, terminal 320 is actually a part of conductor 324, formed by bending a tab extending from conductor 324 at a 90 degree angle, although other embodiments may have an electrical connection such as a weld. Each of the battery packs 312-314 may use a similar construction as that described above for battery pack 316.

In one embodiment, the flow of current through the battery bricks, looking at the narrow side, would be seen as back and forth through adjacent sets of parallel-connected battery bricks. However, when viewed from the flat face of the pack 312-316, the flow of current is circular, starting at one terminal, such as terminal 322 and ending up at approximately the same position (though on the opposite face as the current started). This enables the two terminals on the battery pack to be located at the same height as one another, allowing for short series connections between adjacent battery packs 312-316. This is achieved via placement and shape of the conductors within each pack, as will now be described.

Figure 4A:
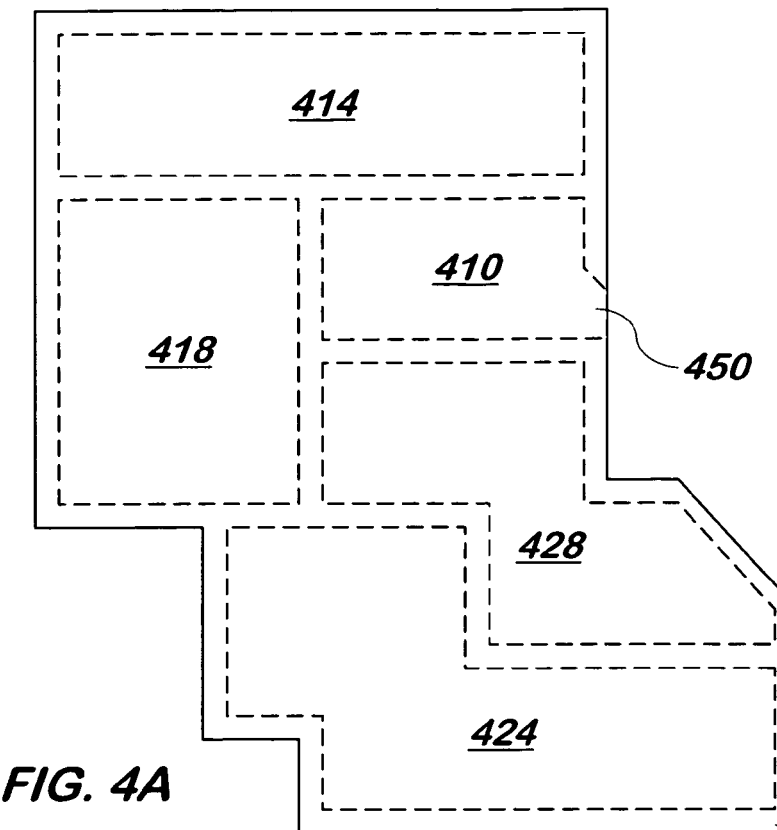
FIGS. 4A and 4B are a diagram of the conductors of each of the two sides of a battery pack according to one embodiment of the present invention.
Figure 4B:
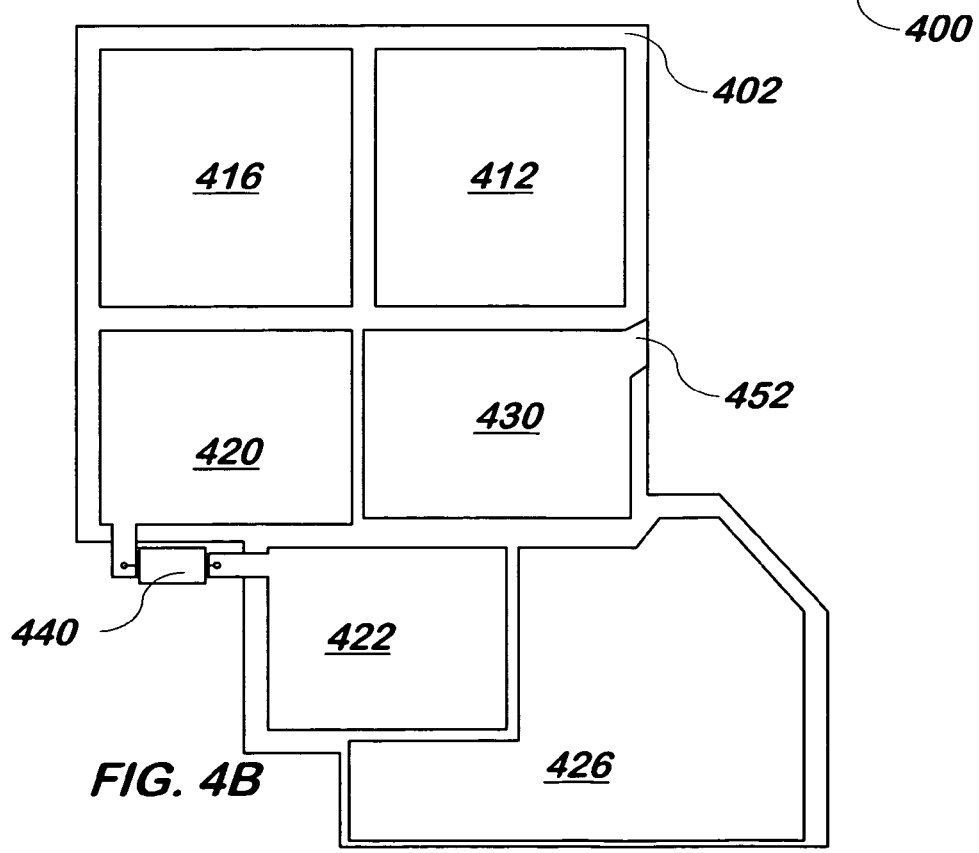

Referring now to FIGS. 4A and 4B, an arrangement of the conductors on either side of a battery pack are shown according to one embodiment of the present invention. Conductors 410, 414, 418, 424 and 428 are on the far side of substrate 400 and conductors 412, 416, 420, 422, 426 and 430 are on the near side of substrate 402. When substrate 402 is placed behind substrate 400 and sets of batteries are placed between them, the conductors and batteries form an electrical connection from edge 450 to edge 452 or vice versa. For example, the positive terminals of a set of batteries are electrically connected to conductor 410, such as may be described in the related application. The positive polarity terminals of that same set of batteries are electrically coupled to the lower half of conductor 412. Negative terminals of another set of batteries are electrically coupled to the upper half of conductor 412, and the positive terminals of that other set of batteries are electrically coupled to the right half of conductor 414. Thus, the two sets of batteries are coupled in series to one another. Multiple sets of batteries are coupled in this manner via the conductors 410-430, with current flowing in numerical order of the conductors, or in reverse order, with the resulting flow being circular when viewed from the flat face of the pack. However, conductors 420 and 422 operate as a single conductor, with fuse 440 electrically coupled between them to electrically protect the batteries as described in the related application. In one embodiment, a bus bar similar or identical to that described herein is used in place of fuse 440 in the event that fusing is not desired or required.

End 450 of edge conductor 410 and end 452 of edge conductor 410 is folded 90 degrees to form a terminal, in a manner similar to that shown for terminal 320 of edge conductor 324 of FIG. 3. Referring again to FIG. 3, the terminal of one pack 312, 314, 316 is electrically connected to the nearest terminal of another pack 312, 314, 316 using a flexible bus bar 390, for example, as shown between packs 314-316. No flexible bus bar is shown between packs 312 and 314, but one could be installed there if a series connection between the two packs 312, 314 was desired. Any number of packs may be connected using any manner described herein.

In one embodiment, the flexible bus bar 390 is made of a conventional braided conductive metal 350, such as copper or aluminum, onto which conductive terminals 360, 370 may be crimped or otherwise electrically connected. Each terminal may have a hole, such as hole 380, to accept a screw, which is inserted through hole 380, and threaded into a hole 322 in terminal 320 of any battery pack. The hole 322 may be threaded or self tapping screws may be used. When the screw, thus inserted and threaded, is tightened, it physically and electrically connects the terminal 320 to the bus bar 390. The head 340 from such a screw is shown in the Figure with the screw head 340 parallel to the face of the pack 312, the terminal of which the screw is threaded into.

A similar connection is made to the opposite polarity terminal of the adjacent battery pack using the other terminal of the same bus bar.

Another Embodiment

Parallel and Series Connections

Figure 4C:
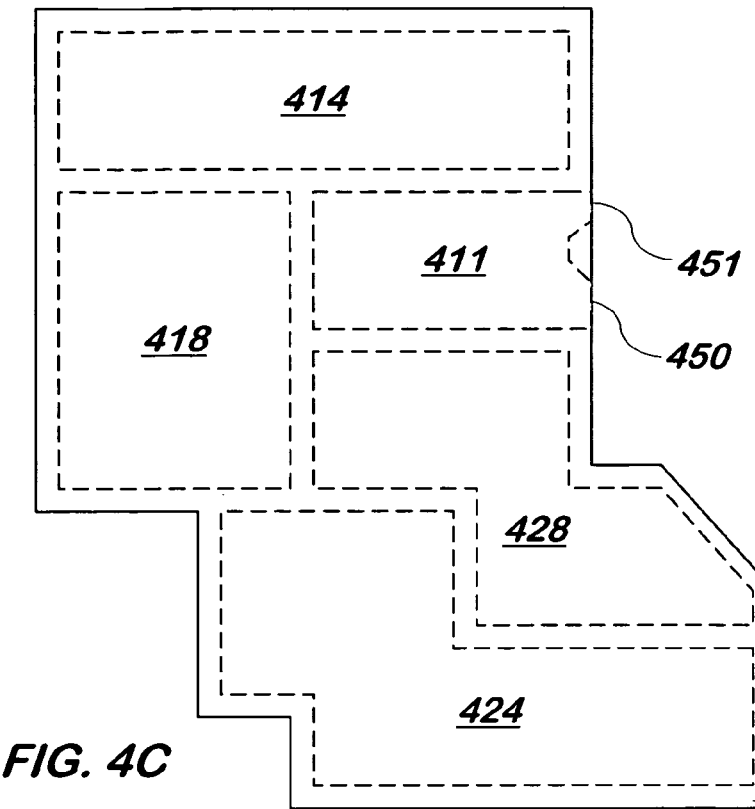
FIGS. 4C and 4D are a diagram of the conductors of each of the two sides of a battery pack according to another embodiment of the present invention.
Figure 4D:
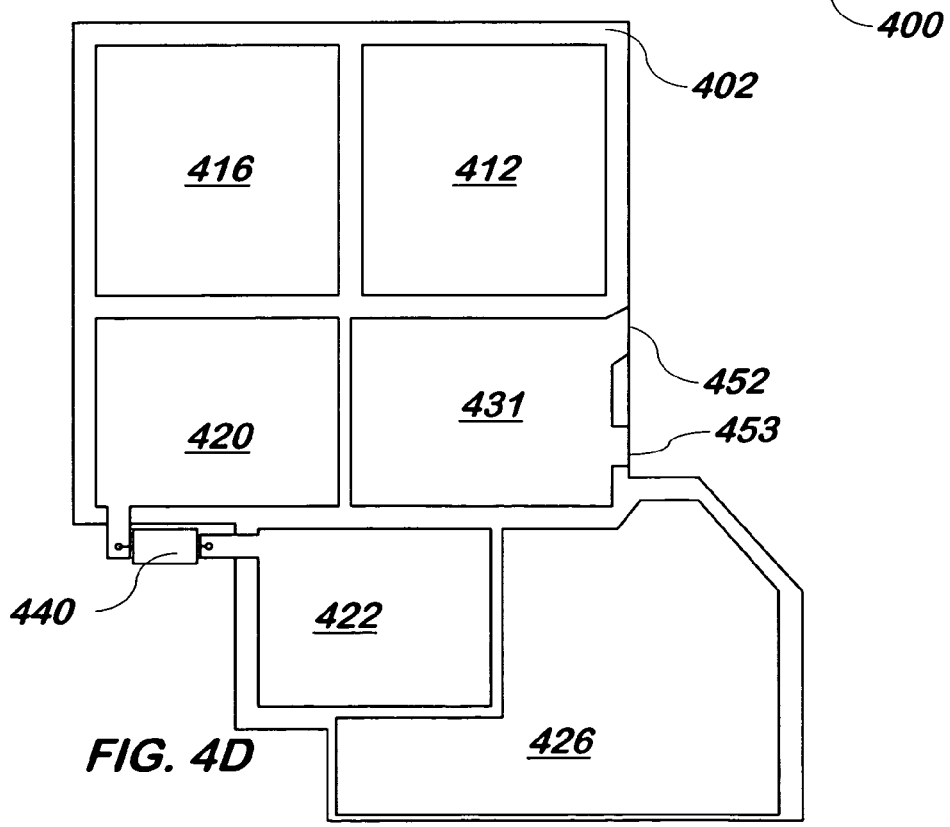

In one embodiment of the present invention, the terminal conductors are shaped to allow series connections, parallel connections or both. Referring now to FIGS. 4C and 4D, the conductors are the same as described above with reference to FIGS. 4A and 4B, respectively, but the terminal conductors 410 and 430 of FIGS. 4A and 4B have been replaced with conductors 411 and 431 of FIGS. 4C and 4D. Conductor 411 has terminal 451 that is folded over the face of the battery pack (or is coupled to a terminal on that face) and conductor 431 has terminal 453 that is folded over the face of the battery pack or is coupled to a terminal on that face. In all other respects, the position of the conductors and flow of current is the same.

Referring now to FIG. 5, a battery assembly 500 containing four battery packs 512-518 is shown. Each battery pack 512-518 is similar to that of battery packs 312-316, except that they use the conductors shown in FIGS. 4C and 4D to connect the batteries in each set to one another in parallel and to connect adjacent sets of batteries to one another in series. This is in contrast to the battery packs of FIG. 3, which employ the conductors of FIGS. 4A and 4B. Packs 512 and 514 are coupled to one another in series via flexible bus bar 522 and packs 516 and 518 are coupled to each other in series via flexible bus bar 524. Each pair of series-coupled packs 512, 514 being one pair and 516, 518 being another, are coupled in parallel via flexible bus bars 530, 532.

Each of the terminals used for the series connections are at or near the same height relative to the bottom edge of the battery packs 512-518. Each of the terminals used for the parallel connections of one polarity are at the same height relative to the bottom edge of the battery packs 512-518. The terminals used for the series connections are at a height relative to the bottom edge of the battery packs 512-518 that is different from the height, relative to the bottom edge of the battery packs, of each terminal used for the parallel connections, and each polarity of the terminals used for the parallel connections are at a different height, relative to the bottom edge of the battery packs 512-518 from one another. This arrangement ensures that the flexible bus bars remain as short as possible and do not cross one another.

Insulators (not shown) may be placed over the terminals that flexible bus bars 530 and 532 cross, to avoid a connection between the bus bars and those terminals. In another embodiment, flexible bus bars are insulated. In still another embodiment, the unused terminals are scored just behind the bend, to allow them to be snapped off and removed, so that connection to the bus bar is not possible.

This manner of extending terminals from the battery packs allows for complete flexibility of connection. The two edge terminals 540, 542 may be used as terminals for the assembly.

Method

Figure 2:
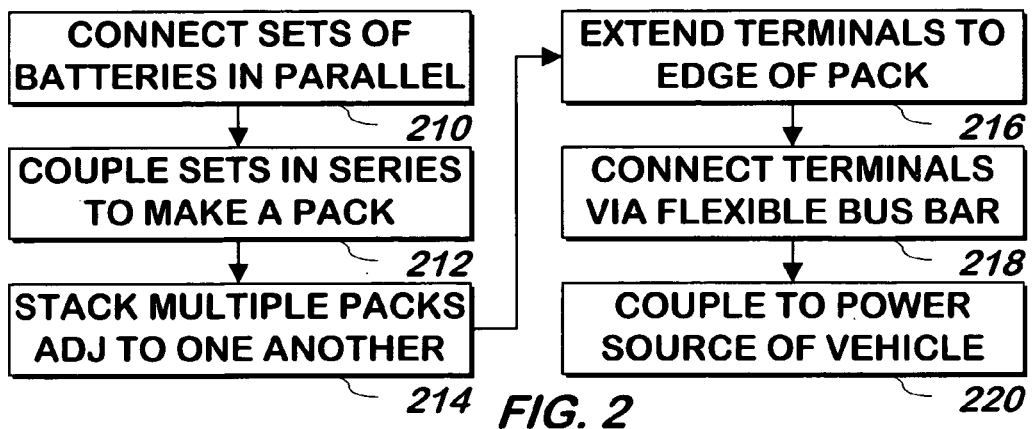
FIG. 2 is a flowchart illustrating a method of connecting battery packs according to one embodiment of the present invention.

FIG. 2 is a flowchart illustrating a method of connecting battery packs according to one embodiment of the present invention.

Connect Sets of Batteries in Parallel

Referring now to FIG. 2, a set or sets of batteries are connected in parallel 210 to form battery bricks. To connect the set(s) of batteries in parallel, the method described above, and in the related applications, may be used.

Couple Sets in Series to Make a Pack

In one embodiment, as described above, battery bricks (e.g. nine battery bricks) are coupled in series to form battery packs 212. In one embodiment, step 212 includes connecting the battery bricks in such a manner that the terminals will appear at opposite sides of the battery packs as described above. In one such embodiment, current flows back and forth between the opposite sides of the battery pack, and relative to the sides of the pack, flows in a circle around the periphery of the pack as described above. At each end of the series connection, two terminals will exist, one of each polarity.

Extend Terminals to Edge of Pack

Packs are stacked adjacent, or nearly adjacent, to one another 214 that will not be between the stacked packs. Battery terminals are extended to the edge of each battery Pack 216. To extend the terminals to the edge of the pack, conductive materials, such as metal plates, are positioned on an outside edge of the battery pack and connected to, or formed into, each of two terminals at the end of the series connection described above to extend the flow of current to the exterior of the battery pack. In one embodiment, the two terminals extend from the top and bottom of the pack, and in another embodiment, the two terminals extend from either side of the pack, and in still another embodiment, there are four terminals as described above: one for series connection and another for parallel connection and each of the terminals for a pack fold over the same side of the pack, to save space and eliminate the possibility that screws will fall into the pack, as described above.

Connect Terminals Via Flexible Bus Bar

A terminal from one battery pack is connected to one a terminal from at least one other battery pack using a flexible bus bar 218. To connect the external terminals with a flexible bus bar, each end of the flexible flex bar is physically and electrically connected to the terminals on adjacent battery packs. For example, a screw may be inserted through a terminal connector of the flexible bus bar to a threaded hole on a terminal of the battery pack to connect each end of the flexible bus bar to a terminal of a different battery pack. The multiple, thin wire strands of the flexible bus bar allow a high current carrying capacity with a minimal danger of stresses and fractures in the flexible bus bar or battery pack in a high vibration environment, as described above. In one embodiment, the battery packs may be coupled in parallel as illustrated in FIG. 1, or in another embodiment, the battery packs may be coupled in series as illustrated in FIG. 3, in each case via one or more flexible bus bars. In another embodiment, a combination of series and parallel couplings are used. In one embodiment, the current carried by the flexible bus bar is in excess of 30, 50, 100, 150, 200, 250, 300 or 500 amps.

The batteries thus connected may be coupled to the power source of an electric or hybrid vehicle, such as an electric motor of an automobile or rocket 220.

Figure 6:
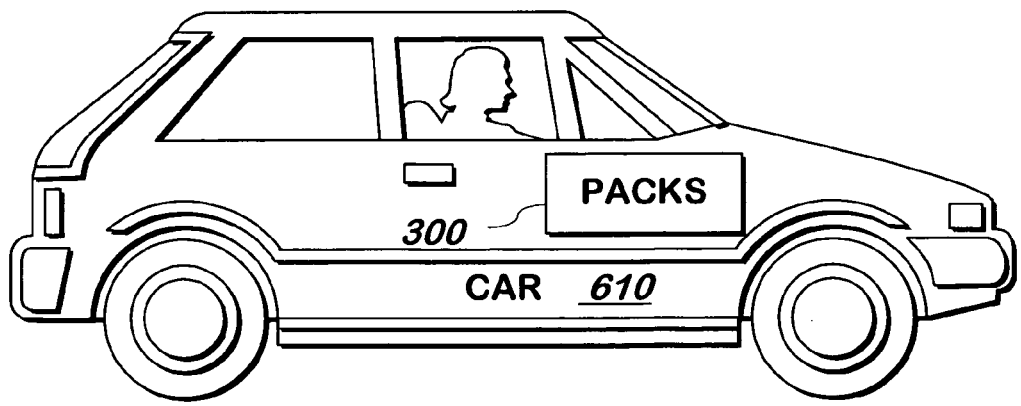
FIG. 6 is a block schematic diagram of a vehicle containing the set of interconnected battery packs of FIG. 1, 3, 5, or any of these according to one embodiment of the present invention.

The method of FIG. 2 may be use to build the battery assembly consisting of two or more battery packs and one or more interconnecting bus bars, and such a battery assembly may be used to build an other products. Such products may include some or all of the power storage and supply of a battery- or hybrid-powered automobiles, rockets or other vehicles 610 of FIG. 6. The steps of FIG. 2 are used to construct the battery assembly, such as those described with respect to FIG. 1, 3 or 5, either in the vehicle, or separately so that it may be added to the vehicle. The remainder of the vehicle may be constructed using conventional techniques.

What is claimed is:

1. A method of forming a power source, the method comprising the steps of:

forming a first plurality of battery bricks of a first polarity, wherein each battery brick of said first plurality of battery bricks is comprised of a first set of batteries, wherein said step of forming said first plurality of battery bricks further comprises the step of assembling each first set of batteries in a single battery layer and electrically connecting the batteries of said first set of batteries in parallel to one another, wherein each battery brick of said first plurality of battery bricks is comprised of a first positive brick terminal electrically connected to each positive battery terminal of said first set of batteries and a first negative brick terminal electrically connected to each negative terminal of said first set of batteries;

forming a forming a second plurality of battery bricks of a second polarity that is reversed from said first polarity, wherein each battery brick of said second plurality of battery bricks is comprised of a second set of batteries, wherein said step of forming said second plurality of battery bricks further comprises the step of assembling each second set of batteries in a single battery layer and electrically connecting the batteries of said second set of batteries in parallel to one another, wherein each battery brick of said second plurality of battery bricks is comprised of a second positive brick terminal electrically connected to each positive battery terminal of said second set of batteries and a second negative brick terminal electrically connected to each negative terminal of said second set of batteries;

assembling said first and second pluralities of battery bricks to form a battery pack comprised of a single layer of battery bricks interposed between a first battery pack side and a second battery pack side, wherein said step of assembling said first and second pluralities of battery bricks further comprises the step of mounting each battery brick of said first plurality of battery bricks adjacent to at least one battery brick of said second plurality of battery bricks, wherein said step of assembling said first and second pluralities of battery bricks further comprises the step of mounting each battery brick of said first plurality of battery bricks such that current flows in said first set of batteries in a first direction between said first battery pack side and said second battery pack side, wherein said step of assembling said first and second pluralities of battery bricks further comprises the step of mounting each battery brick of said second plurality of battery bricks such that current flows in said second set of batteries in a second direction between said first battery pack side and said second battery pack side, wherein said first direction is opposite to said second direction, and wherein said first and second directions are substantially perpendicular to said first and second battery pack sides; and electrically interconnecting said first and second pluralities of battery bricks of said battery pack, wherein said step of electrically interconnecting said first and second pluralities of battery bricks further comprises the step of electrically interconnecting each of said first plurality of battery bricks in series with each of said second plurality of battery bricks such that said current flows brick to brick in a substantially circular direction around the periphery of said battery pack relative to each of said first and second battery pack sides, and terminates with a pair of battery pack terminators.

2. The method of claim 1, further comprising the steps of:
assembling a plurality of battery packs in accordance with the steps of claim 1; and
electrically coupling the plurality of battery packs to one another to form said power source.

3. The method of claim 2, wherein the plurality of battery packs are coupled to one another in series.

4. The method of claim 2, wherein the plurality of battery packs are coupled to one another in parallel.

5. The method of claim 2, wherein some of the plurality of battery packs are coupled to one another in series and other of the plurality of battery packs are coupled to one another in parallel.

6. The method of claim 1, wherein said step of electrically interconnecting said first and second pluralities of battery bricks further comprise the step of electrically interconnecting said first plurality of battery bricks to said second plurality of battery bricks with a first set of conductors corresponding to said first battery pack side and with a second set of conductors corresponding to said second battery pack side.

7. A power source, comprising:
a first plurality of battery bricks of a first polarity, wherein each battery brick of said first plurality of battery bricks is comprised of a first set of batteries, wherein all batteries within each battery brick of said first plurality of bricks are electrically connected in parallel to one another, and wherein each battery brick of said first plurality of bricks is comprised of a single layer of batteries of said first set of batteries such that each positive terminal of said first set of batteries is electrically connected to a first positive brick terminal and each negative terminal of said first set of batteries is electrically connected to a first negative brick terminal;
a second plurality of battery bricks of a second polarity that is reversed from said first polarity, wherein each battery brick of said second plurality of battery bricks is comprised of a second set of batteries, wherein all batteries within each battery brick of said second plurality of bricks are electrically connected in parallel to one another, and wherein each battery brick of said second plurality of bricks is comprised of a single layer of batteries of said second set of batteries such that each positive terminal of said second set of batteries is electrically connected to a second positive brick terminal and each negative terminal of said second set of batteries is electrically connected to a second negative brick terminal; and
a battery pack comprised of said first and second pluralities of battery bricks assembled in a single layer of battery bricks interposed between a first battery pack side and a second battery pack side, wherein each battery brick of said first plurality of battery bricks is adjacent to at least one battery brick of said second plurality of battery bricks;
a first set of conductors corresponding to said first battery pack side; and
a second set of conductors corresponding to said second battery pack side, wherein said first plurality of battery bricks are electrically connected in series with said second plurality of battery bricks via said first and second sets of conductors, wherein within each battery brick of said first plurality of battery bricks current flows in a first direction between said first and second battery pack sides and wherein within each battery brick of said second plurality of battery bricks current flows in a second direction between said first and second battery pack sides, and wherein current flows from brick to brick in a substantially circular direction around the periphery of said battery pack relative to said first and second battery pack sides, and terminates with a pair of battery pack terminators.

8. The power source of claim 7, further comprising:
a plurality of battery packs assembled in accordance with claim 7; and
a set of battery pack conductors electrically coupling said plurality of battery packs to one another to form said power source.

9. The power source of claim 8, wherein the plurality of battery packs are coupled to one another in series via said set of battery pack conductors.

10. The power source of claim 8, wherein the plurality of battery packs are coupled to one another in parallel via said set of battery pack conductors.

11. The power source of claim 8, wherein some of the plurality of battery packs are coupled to one another in series and other of the plurality of battery packs are coupled to one another in parallel.

* * * * *